United States Patent
Skiba et al.

(10) Patent No.: US 10,810,599 B2
(45) Date of Patent: Oct. 20, 2020

(54) LIVE ASSIST

(71) Applicant: Avaya, Inc., Basking Ridge, NJ (US)

(72) Inventors: David Skiba, Golden, CO (US);
George Erhart, Loveland, CO (US);
Valentine C. Matula, Granville, OH (US)

(73) Assignee: Avaya Inc., Basking Ridge, NJ (US)

( * ) Notice: Subject to any disclaimer, the term of this patent is extended or adjusted under 35 U.S.C. 154(b) by 1247 days.

(21) Appl. No.: 14/243,108

(22) Filed: Apr. 2, 2014

(65) Prior Publication Data

US 2015/0287039 A1   Oct. 8, 2015

(51) Int. Cl.
*G06Q 30/00* (2012.01)

(52) U.S. Cl.
CPC .................... *G06Q 30/016* (2013.01)

(58) Field of Classification Search
None
See application file for complete search history.

(56) References Cited

U.S. PATENT DOCUMENTS

| | | | |
|---|---|---|---|
| 2007/0066396 A1* | 3/2007 | Weston | A63F 13/24 463/39 |
| 2008/0248815 A1* | 10/2008 | Busch | H04L 67/18 455/456.5 |
| 2010/0145784 A1* | 6/2010 | Sriver | G01C 21/20 705/14.25 |
| 2010/0228574 A1* | 9/2010 | Mundinger | G01C 21/3423 705/4 |
| 2010/0296417 A1 | 11/2010 | Steiner et al. | |
| 2011/0244798 A1* | 10/2011 | Daigle | G06Q 30/0645 455/41.2 |
| 2012/0253902 A1* | 10/2012 | Carney, II | G06Q 30/02 705/14.12 |
| 2013/0144704 A1* | 6/2013 | Williams | H04M 15/8083 705/14.27 |
| 2013/0185137 A1* | 7/2013 | Shafi | G06Q 30/0207 705/14.35 |

(Continued)

FOREIGN PATENT DOCUMENTS

WO   WO2001040959 A1   6/2001

OTHER PUBLICATIONS

"What is live chat support?", SKYPE, Aug. 19, 2013, 5 pages, retrieved from https://support.skype.com/en/faq/FA10656/what-is-live-chat-support.

*Primary Examiner* — Andrew B Whitaker
(74) *Attorney, Agent, or Firm* — Sheridan Ross P.C.

(57) ABSTRACT

Customer assistance is provided by leveraging certain contact center infrastructure components to a retail setting. Often contact centers have a wealth of information regarding individual products and services a retail setting may offer. The information, as provided herein, may then be delivered to the customer in the form of a dialogue. The dialogue may be based, in part, on a contact center dialogue for the same or similar item. The customer may then be instructed to perform an act, such as retrieving another item at a certain location. Unlike a contact center, the physical presence of the customer provides an opportunity to receive feedback in the form of monitor the customer's actions to determine if the customer complied with instructions. Optionally, a follow up activity may be imitated based on the customer's compliance.

20 Claims, 4 Drawing Sheets

(56) References Cited

U.S. PATENT DOCUMENTS

| | | | |
|---|---|---|---|
| 2013/0203439 A1* | 8/2013 | Lifshitz | H04W 64/00 455/456.2 |
| 2014/0052555 A1* | 2/2014 | MacIntosh | G06K 9/00664 705/23 |
| 2015/0269600 A1* | 9/2015 | Randle | G06Q 30/0207 705/14.14 |

* cited by examiner

LIVE ASSIST

FIELD OF THE DISCLOSURE

The present disclosure is generally directed toward systems for providing customer assistance.

BACKGROUND

Retail establishments constantly endeavor to improve the customer experience and maximize sales. Oftentimes opportunities are lost to improve customer relations at the final point of contact, the check-out. When the customer is checking out and paying for his or her items, the experience can be impersonal and uninformative.

SUMMARY

It is with respect to the above issues and other problems that the embodiments presented herein were contemplated.

With respect to certain embodiments herein, a real-time tool is provided to assist customer-service employees in a retail environment to help maximize the customer experience which may help to increase sales or improve customer satisfaction. In certain embodiments disclosed herein, real-time training and instruction are provided to customer-service representatives that may be useful during customer interactions in the retail environment.

In one embodiment, a system and method is disclosed to provide a real-time communication session between a customer-service representative and a repository having information that may be useful to the customer-service representative. The channel of communication may include one or more of: audio (PSTN, VoIP, Ethernet, wireless, Bluetooth, etc.), Instant Messaging (IM), Web Real-Time Communications (WebRTC), and other communication channels. The communications channels may be further embodied as web-based (e.g., TCP/IP) communications.

In another embodiment, the communication session is initiated based on audio signals. Voice signals originating from the customer or customer-service representative may be used to trigger an instruction/assistance dialogue. Different dialogues, or scripts, may then be delivered based on the triggering audio signal. For example, if the customer states, "where is [a particular product] located in the store," an appropriate dialogue will be sent to the customer-service representative providing the appropriate script to the customer-service representative such that the customer-service representative can provide the customer with the requested information.

In another embodiment, generation and/or delivery of the dialogue or script may be initiated by the customer-service representative. The representative may be working at a check-out register/point-of-sale terminal and initiate the dialogue/script based on a particular item being purchased by the customer. For example, if the customer is in a department store and purchasing slacks, the representative may initiate a dialogue by scanning the particular bar code associated with the slacks. Scanning of the bar code may trigger the generation of a dialogue that directs the representative to inquire if the customer had seen the shirt, shoes, or belt that match the slacks being purchased. As a benefit, improved customer experience and added sales may be realized.

In another embodiment, the representative may interact with the customer over one or more channels and/or devices, such as, tablet computers, audio ear-pieces/headsets, mobile telephones, in store terminals, kiosks, and other existing communication modes and/or devices. Analysis associated with triggering a dialogue and/or feedback of the dialogues success, may be based on agent monitoring (voice/video), customer monitoring (voice/video), location in store, purchased/examined items, customer profile, and current store conditions (empty/crowded).

The embodiments disclosed may further permit the system to monitor the performance of the instructions in a dialogue. For example, determining if the customer actually went to the location of the belts may help determine if the instructions in the dialogue were useful, properly delivered to the customer, and understood by the customer. In yet another embodiment, the physical environment of the store may be monitored and used as an input, for example, instructing a representative to walk a customer to a location versus instructing the agent to tell the customer of the location, as a response to the level of activity with the store, complexity associated with reaching the location, or other attribute.

In one embodiment, a method is disclosed, comprising: receiving information regarding a customer action of a customer at a first location; conveying indicia of the customer action to a microprocessor; selecting, by the microprocessor, a dialogue from a set of dialogues in response to the customer action, the dialogue having a first action requesting the customer to move to a second location; transmitting the dialogue to a device for delivery to the customer; and monitoring, by the microprocessor, the customer for compliance with the first action by the customer.

In another embodiment, a system is disclosed, comprising: a microprocessor with a logical connection to a network; a database accessible by the microprocessor; an input device operable to receive indicia of a customer action and report the indicia to the microprocessor; and wherein the microprocessor is operable to access the database and select a dialogue from the database associated with the indicia, the dialogue having a first action requesting the customer to move to a second location, transmit the dialogue via the network for delivery to the customer, and monitor the customer for compliance with the first action by the customer.

In yet another embodiment, a non-transitory medium is disclosed with instructions thereon that when read by a machine cause the machine to perform: receiving information regarding a customer action of a customer at a first location; conveying indicia of the customer action to a microprocessor; selecting, by the microprocessor, a dialogue from a set of dialogues in response to the customer action, the dialogue having a first action requesting the customer to move to a second location; transmitting the dialogue to a device for delivery to the customer; and monitoring, by the microprocessor, the customer for compliance with the first action by the customer.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine," "calculate," and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that other aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

The identification in the description of element numbers without a subelement identifier, when a subelement identifiers exist in the figures, when used in the plural, is intended to reference any two or more elements with a like element number. A similar usage in the singular, is intended to reference any one of the elements with the like element number. Any explicit usage to the contrary or further qualification shall take precedent.

The exemplary systems and methods of this disclosure will also be described in relation to analysis software, modules, and associated analysis hardware. However, to avoid unnecessarily obscuring the present disclosure, the following description omits well-known structures, components and devices that may be shown in block diagram form, and are well known, or are otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
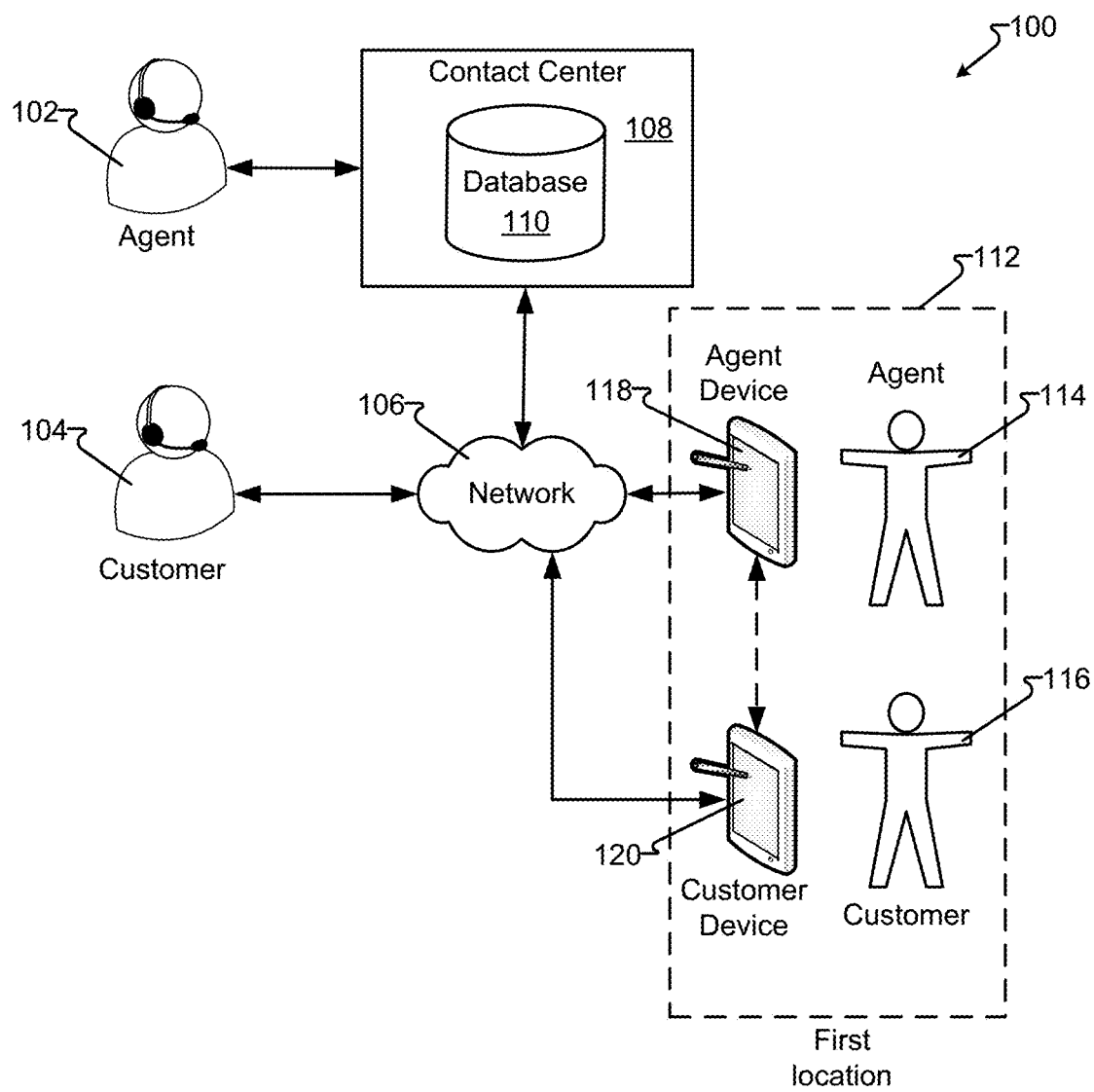
FIG. 1 depicts a customer service system in accordance with embodiments of the present disclosure.

With reference now to FIG. 1, a customer service system will be described in accordance with embodiments of the present disclosure. In one embodiment, customer 104 may utilize communication device 105 (e.g., telephone, cellular phone, voice and/or data portion of a smartphone, computer, etc.) to accesses contact center 108 via network 106. Contact center 108 receives and assigns the contact—the call, message, or other form of communication to and/or from customer 104—to/from remote agent 102. Remote agent 102 then processes the contact. Remote agent 102 may utilize database 110 to retrieve and/or be presented with, a dialogue to deliver to customer 104. Database 110 may contain dialogues, which may further comprise instructions to be performed by remote agent 102 and/or customer 104. Dialogues may alone or in concert with other systems and processes, instruct the recipient to perform an action, answer a question, resolve an issue, and/or to suggest other actions. For example, remote agent 102 may receive a purchase order for a product from customer 104 and be presented with a dialogue from database 110 to recommend a complementary item for purchase by customer 104. The recommendation may be in, or put in, the form of a script or dialogue. The recommendation may be for a complementary item (e.g., a belt to match the shoes purchased, cables to enable connectivity of a selected television, etc.) or items based on an analysis of database 110. For example, if a significant number of prior customers have bought two items, even though the relationship between the items has not been established, customer 104 who purchases one of the items may be presented with a dialogue offering the second item for purchase. The delivery of the dialogue may be directly to customer 104, such as via device 105, or presented to remote agent 102 for delivery to customer 102.

Contact center 108 is illustrated without the well known components of contact centers for the avoidance of unnecessarily complicating FIG. 1. It should be appreciated that contact center 108 is embodied with the customary systems, personnel, and connectivity to operate as a contact center. Contact center 108 may also incorporate some or all components generally associated with a contact center operable to connect to network 106 and a customer phone or other communication device.

Network 106 is operable to facilitate communication between nodes. Examples of network 106 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over IP (VoIP) network, a cellular network, and any other type of packet-switched or circuit-switched network known in the art. In addition, it can be appreciated that network 106 need not be limited to any one network type, and instead may be comprised of a number of different networks and/or network types. As one example, embodiments of the present disclosure may be utilized to increase the efficiency of a grid-based contact center. Examples of a grid-based contact center are more fully described in U.S. patent application Ser. No. 12/469,523 to Steiner, the entire contents of which are hereby incorporated herein by reference. Moreover, network 106 may comprise a number of different communication media such as coaxial cable, copper cable/wire, fiber-optic cable, antennas for transmitting/receiving wireless messages, and combinations thereof. Similarly, customer 104 may utilize a communication device operable to connect to network 106, including a POTS connected telephone, cellular telephone, VoIP phone, or other device operable to facilitate voice communications via network 106.

In another embodiment, first location 112 is at least a portion of a retail setting, such as a store, portion of a store, customer service desk, kiosk, etc. Customer 116 is within first location 112 which may contain on-premises agent 114. At least one of agent device 118 and customer device 120 is operable to connect to network 106 and, in turn, contact center 108. In one embodiment, at least one of agent device 118 and customer device 120 is a smart phone, tablet, laptop, radio and base station, pager, wearable computer, or other means by which on-premises agent 114 and/or customer 116 may connect to network 106 and contact center 108. In a further embodiment, agent device 118 may be placed in communication with customer device 120 via near field radio, Bluetooth, infrared, email, SMS, or other communication connectivity means. In still a further embodiment, one of agent device 118 and customer device 120, when in communication with each other, may utilize the other's connection to network 106 to communicate with contact center 108.

It should be noted that agent device 118 is generally associated with on-premises agent 114 and customer device 120 is generally associated with customer 116. The association may be one of ownership, assignment, and/or control. However, such an association does not preclude agent device 118 and/or customer device 120 being made available to another party for utilization thereof. For example, on-premises agent 114 may have a dialogue or portion of a dialogue displayed on agent device 118 which is then presented to customer 116.

In another embodiment, contact center 108 may be made aware of a customer action, of customer 116, such as by on-premises agent 114 inputting indicia of the customer action into agent device 118 and/or customer 116 inputting indicia of the customer action into customer device 120. Additionally, customer actions may be reported by sensing devices, such as cameras, sensors, terminals (e.g., point-of-sale, kiosk, etc.), or other devices (such as those illustrated with respect to FIG. 2). In another embodiment, at least one of agent device 118 and customer device 120 receives a dialogue selected by a microprocessor of contact center 108 from a set of dialogues stored in database 110 in response to the indicia.

Figure 2:
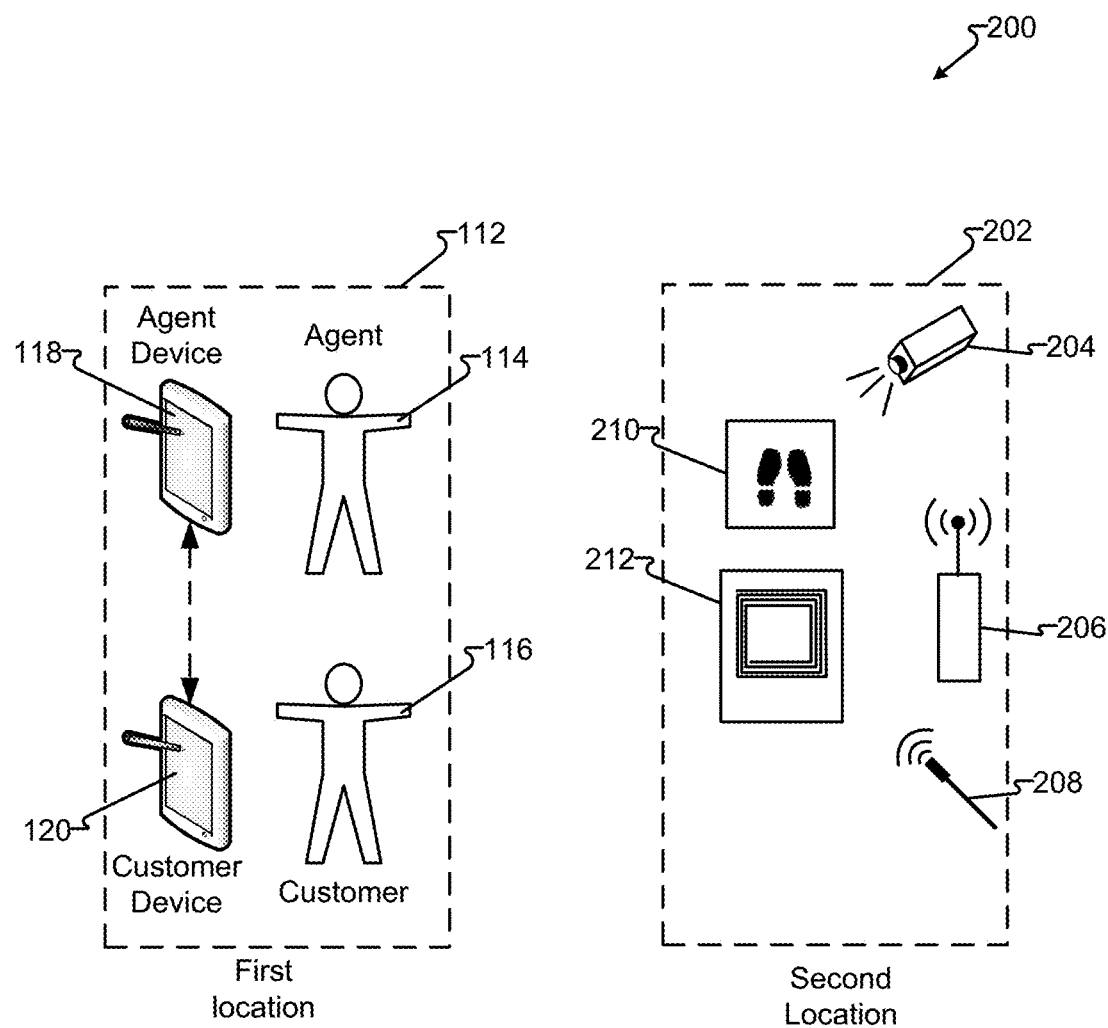
FIG. 2 depicts a retail setting in accordance with embodiments of the present disclosure.

With reference now to FIG. 2, a retail setting will be described in accordance with embodiments of the present disclosure. In one embodiment, customer 116 receives a dialogue. The dialogue may be delivered to customer 116 via customer device 120, agent device 118, on-premises agent 114 via agent device 118, or by another communications terminal. The dialogue delivered to customer 112 comprises at least one instruction and compliance with the at least one instruction may be determined by an electronic system including a microprocessor. In one embodiment, a dialogue delivered to customer 116 requires the customer to move to second location 202.

The presence of customer 116 may be detected by one or more sensing devices. Sensing devices may include camera 204 with associated presence recognition software, radio receiver 206 operable to detect the presence of a radio transmitter associated with the customer (e.g., a signal from customer device 120), microphone 208, pressure mat 210, or other sensing device. In one embodiment, the sensing device is operable to determine the presence of customer 116. In another embodiment, the sensing device is operable to determine the presence of a non-specific person and conclude, with a reasonable degree of certainty, that the non-specific person is customer 116. In a further embodiment, the determination of customer 116 as being the identified non-specific person considers, and excludes all others persons who are known not to be customer 116 and their location. For example, on-premises agent 114 may be tracked with associated locating systems and if on-premises agent 114 location is known to be not within second area 202, then the probability of a non-specific person within second location 202 being that of customer 116, is therefore more likely.

In another embodiment, item 212 contains an interaction indicator, such as a radio-frequency identifier ("RFID") operable to report the location of item 212 and/or a sensor (e.g., accelerometer) and sensor reporting means (e.g., a transmitter). In another embodiment, the dialogue delivered to customer 116 includes instructions to retrieve, examine, pick-up, or otherwise interact with item 212. For example, the dialogue may instruct customer 116 to retrieve item 212. Item 212, which may incorporate radio transmitter interfacing with transmitter/receiver 206 and determine that item 212 has been touched and/or moved. If customer 116 is known to be in second location 202 and/or not in a third location, then the motion of item 212 may then be associated with customer 116 and further determined that customer 116 is complying with the instructions to retrieve item 212.

In another embodiment, customer's 116 lack of compliance with dialogue may be determined upon detecting customer's 116 performance of a different action. For example, a dialogue instructs customer 116 to move to a third location (not shown). However, sensors, such as camera 204, microphone 208, pressure mat 210, and/or item 212 report the presence and/or interaction of customer 116. Accordingly, customer 116 may be determined to not to have complied with the instructions within the dialogue. Contact center 108 may then be notified of the non-compliance and a new dialogue may be delivered to customer device 120 and/or agent device 118.

Figure 3:
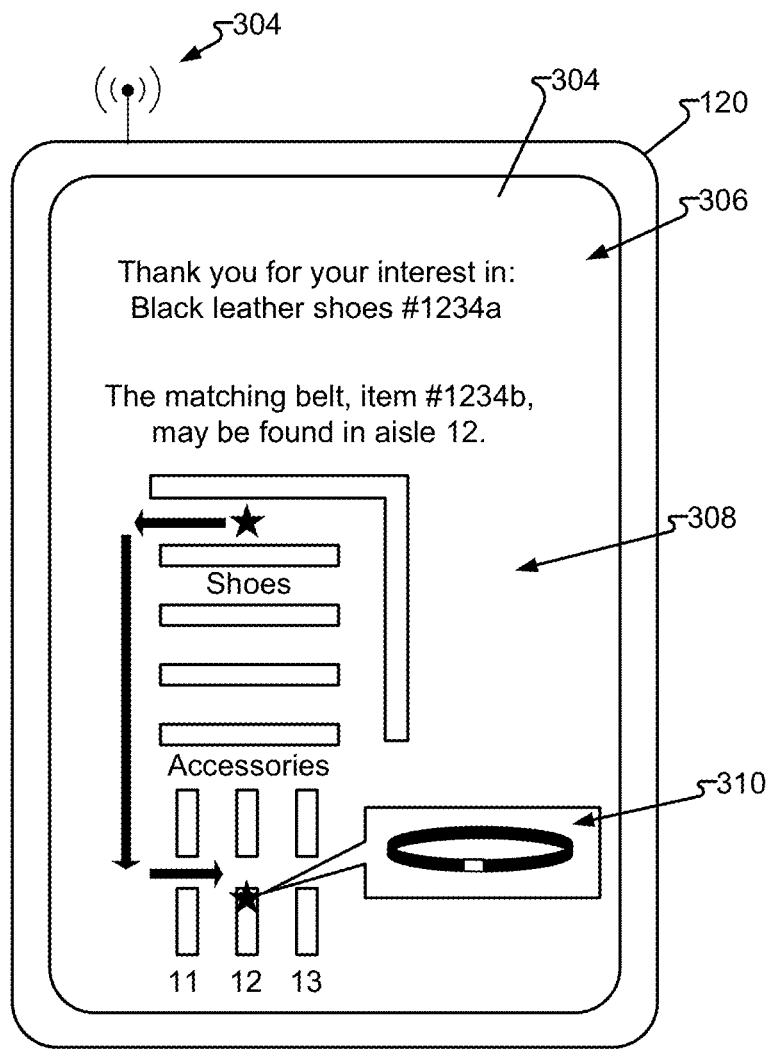
FIG. 3 depicts a dialogue on a display in accordance with embodiments of the present disclosure.

With reference now to FIG. 3, a dialogue on a display will be described in accordance with embodiments of the present disclosure. In one embodiment, customer device 120 has display 304 for the display of text and/or graphical content. Customer device 120 utilizes antenna 304, which may be embodied as internal or external to the form factor of customer device 120, to connect to contact center 108 via network 106. In other embodiments, customer device 120 may utilize infrared or other portions of the electromagnetic spectrum for communications via network 106, such as by interfacing with one or more base or satellite receiver-transmitters, for example, radio receiver/transmitter 206 or other component operable to connect customer device 120 to network 106.

Contact center 108 receives indicia of a customer action, such as by customer 116 interacting with customer device 120, agent device 118, or other device (e.g., kiosk, sensor, etc). At least one microprocessor of contact center 108 then selects dialogue 306 from database 110. Dialogue 306 is then presented to customer device 120, agent device 118, and/or another device, such as the screen of a computer at a kiosk.

Dialogue 306 may include text, audio, video, and/or graphical elements. In one embodiment, dialogue 306 includes an instruction for customer 116 to move to another location, such as to locate an item. Dialogue 306 may incorporate map 308 and image 310 showing the subject item. Dialogue 306 may incorporate turn-by-turn instructions, audio cues, tactile cues, or other means to assist customer 116 in proceeding to the new location.

In another embodiment, if customer 116 performs an action inconsistent with the instructions, such as picking up the wrong item, making a wrong turn, etc., then an agent, such as on-premises agent 114, may be notified via their agent device 118 with a second dialogue instructing on-premises agent 114 to locate customer 116 and offer additional assistance. In another embodiment, customer device 120 may notify customer 116 that they did not comply with the dialogue. For example, if customer 116 was instructed to retrieve a black belt that matched a pair of black shoes, but customer 116 then interacted with a brown belt, a new dialogue may be presented to notify customer 116 of the incorrect item, where to find the correct item, offer to call on-premises agent 114 to assist customer 116, and/or notify the customer where to return the black shoes and/or retrieve the brown shoes that match the brown belt.

In a further embodiment, remote agent 102 and/or on-premises agent 114 may assist customer 102, such as by providing dialogue 306, and then proceed to assisting another customer. Remote agent 102 and/or on-premises agent 114 may be notified via a message, display, pop-up message, or other means once customer's 102 non-compliance with dialogue 306 has been determined. Optionally, notification of customer's 102 compliance with dialogue 306 may also be provided to agent 102 and/or on-premises agent 114. Agent device 118 may be further configured to show progress, compliance, suspected compliance, non-compliance, and/or suspected non-compliance of any one or more customers 116. Suspected compliance may include customer 116 performing at least one intermediate step in accord with dialogue 306, such as when customer 116 is approaching a waypoint to a destination. A suspected non-compliance may include customer 116 failing to perform at least one intermediate step, such as when customer 116 is diverts their movement away from a waypoint assigned by dialogue 306. As a benefit, agent 102 and/or on-premises agent 114 may be made aware of one or more customers 116 and respond to any non-compliance issues or even anticipate suspected non-compliance.

Figure 4:
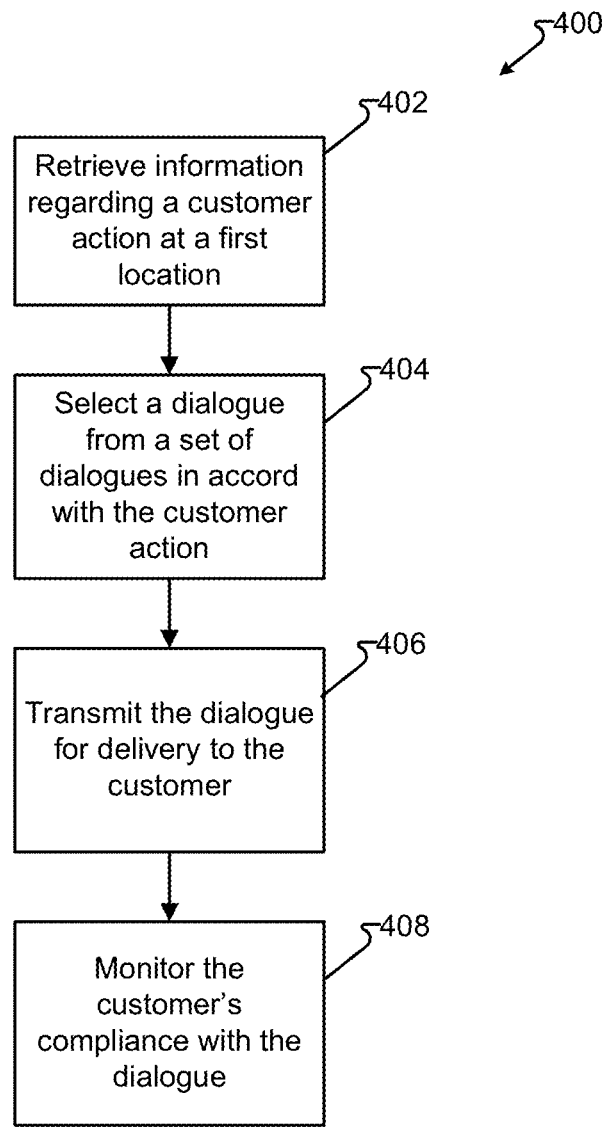
FIG. 4 depicts a process in accordance with embodiments of the present disclosure.

With reference now to FIG. 4, a process will be described in accordance with embodiments of the present disclosure. In one embodiment, step 402 retrieves information regarding a customer action at a first location. The first action may be one or more of purchasing an item, indicating the desire to purchase an item, requesting information on an item, performing an operation associated with customer 116 (e.g., pay a bill, make an account inquiry, change address or other personal information, etc.), returned an item, demonstrated an interest in one or more items or category of items (e.g., moved to a location with televisions and video equipment), or other action customer 116 may perform in a retail setting. For example, customer 116 may express an interest in a particular item and a barcode on the item is scanned, such as by customer device 120, agent device 118, and/or other terminal. Item identifiers may also be input manual, such as by entry of a stock keeping unit ("SKU") or other item identifier. In another embodiment, customer 116 utilizes customer device 120 and a web browser thereon. The web browser then being operable to go to a web page associated with the retail environment whereby the item identifier may be entered.

Following the receipt of information regarding the customer action at the first location, a microprocessor executing instructions selects a dialogue in response to the indicia at step 404. In one embodiment, a microprocessor associated with contact center 108 may perform step 404, such as by selecting a dialogue from database 110. Database 110 may incorporate dialogues developed for the benefit of remote agent 102. As one advantage thereof, retail environment 112 may then leverage the resources and expertise of contact center 108. In another embodiment, microprocessor is within at least one of client device 120 and agent device 118 and the dialogue selected from database 110. Step 406 then transmits the selected dialogue for delivery to the customer, such as via agent device 118 and/or customer device 120. Step 408 then causes the microprocessor to monitor the customer's compliance with the dialogue. For example, a dialogue that instructs a customer to go to a second location may then monitor the second location to detect the presence of the customer, or the likely presence of the customer, and/or the absence of the customer at a third location.

In response to the customer's compliance and/or non-compliance with the dialogue, additional actions may be taken. For example, if a customer made a wrong turn, the dialogue, if presented on customer device 120, may signal the customer (e.g., message, sound, vibration, etc.). In another example, on-premises agent 114 may be notified that the customer may require assistance and deliver an update message on agent device 118. Process 400 may then end upon the customer's compliance with the instructions.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method, comprising:
receiving a signal from a sensor, the signal comprising indicia of an interaction and subject of the interaction comprising an item at a first location, wherein the item at the first location is an item for purchase by a customer;
conveying indicia of the signal to a microprocessor;
accessing, by the microprocessor, a database comprising a set of first dialogues, each first dialogue of the set of first dialogues identifies a second item at a second location, different from the first location, and associated with the first item and a first action to be performed with the second item at the second location and wherein the database further comprises a set of second dialogues, each second dialogue of the set of second dialogues identifies a non-compliance action associated with non-compliance with the first action;
selecting, by the microprocessor, a first dialogue from the set of first dialogues in accord with the signal;
transmitting, by the microprocessor via a network, the selected first dialogue to a device associated with a party comprising the interaction;
monitoring, by the microprocessor, the second item for compliance with the first action; and
upon the microprocessor determining a non-compliance with the first action, selecting, by the microprocessor a second dialogue from the set of second dialogues in accordance with the determined non-compliance with the first action and delivering the selected second dialogue to the device.

2. The method of claim 1, wherein the step of monitoring further comprises monitoring the second item for an interaction.

3. The method of claim 1, wherein the set of first dialogues includes at least one dialogue being selectable as the first dialogue by an agent of a contact center.

4. The method of claim 3, wherein the interaction is a purchase request for the first item and the first dialogue comprises the second item determined in accord with a historical record of a number of past interactions with a number of past customers wherein the past customers purchased the first item and the second item.

5. The method of claim 3, wherein the signal comprises a customer indicated purpose determined by a communication with the contact center.

6. The method of claim 1, wherein transmitting the first dialogue to the device further comprises, transmitting the first dialogue to an electronic communications device of a customer determined to have performed the interaction.

7. The method of claim 1, wherein transmitting the first dialogue to the device further comprises, transmitting the first dialogue to an electronic communications device accessible to a human agent, different from the party performing the interaction.

8. The method of claim 1, wherein the interaction comprises a purchase request for the first item.

9. The method of claim 8, wherein the first dialogue further comprises instructions to retrieve the second item.

10. A system, comprising:
a microprocessor with a connection to a network;
a database accessible by the microprocessor;
an input device operable to receive indicia from a sensor of an interaction by a customer with an item at a first location, wherein the item is an item for purchase by a customer; and
wherein the microprocessor is operable to:
access the database wherein the database comprises a set of first dialogues, each first dialogue of the set of first dialogues identifies a second item at a second location, different from the first location, and associated with the first item and a first action to be performed with the second item at the second location and wherein the database further comprises a set of second dialogues, each second dialogue of the set of second dialogues identifies a non-compliance action associated with non-compliance with the first action;
select the first dialogue from the set of first dialogues in the database associated with the indicia;
transmit the selected first dialogue via the network for delivery to a device associated with the customer;
monitor the second item for an interaction comprising the first action; and
upon the microprocessor determining a non-compliance with the first action, selecting, by the microprocessor, a second dialogue from the set of second dialogues and transmitting the selected second dialogue to the device.

11. The system of claim 10, further comprising a sensor operable to monitor the second item and communicate with the microprocessor to report indicia of the first action to the microprocessor.

12. The system of claim 10, wherein the microprocessor is further operable to transmit the first dialogue to an electronic communications device of the customer.

13. The system of claim 10, wherein the microprocessor is further operable to transmit the first dialogue to an electronic communications device of a human agent, different from the customer, at the first location.

14. A system comprising:
  means for receiving a signal comprising information regarding an interaction with a first item, wherein the first item is an item for purchase by a customer at a first location;
  means for conveying the signal to a microprocessor;
  means for selecting a first dialogue from a set of first dialogues from a database, the selection being in accordance with the interaction and having a first action to be performed with a second item at a second location and wherein the second item is associated with the first item in the database;
  means for transmitting the selected first dialogue to a device;
  means for monitoring the second item for the occurrence of the first action; and
  means for determining a non-compliance with the first action and, in response thereto, means for selecting a second dialogue from a set of second dialogues, the selected second dialogue being selected in accordance with the determined non-compliance and delivering the selected second dialogue to the device for presentation to the customer.

15. The system of claim 14, wherein the means for monitoring, further comprise means for monitoring the second item for an interaction by the customer.

16. The system of claim 14, wherein the means for determining the non-compliance further comprises means to monitor a third location, different from the first location and the second location, and wherein the means to monitor the third location further comprise means to detect the customer in the third location.

17. The system of claim 14, wherein the set of first dialogues includes at least one dialogue being selectable by an agent as the first dialogue.

18. The system of claim 17, wherein the at least one of the set of first dialogues is selectable in accord with a purpose for which the customer initiated a communication with the contact center.

19. The system of claim 14, wherein means for transmitting the first dialogue to the device further comprises means for transmitting the first dialogue to an electronic communications device of the customer.

20. The system of claim 14, wherein means for transmitting the first dialogue to the device further comprises means for transmitting the first dialogue to an electronic communications device accessible to a human agent at the first location.

* * * * *